Dec. 21, 1937.   W. F. ROBERTS   2,102,747
METHOD OF MAKING ORNAMENTED PLASTIC MATERIAL
Filed April 27, 1935   2 Sheets-Sheet 2
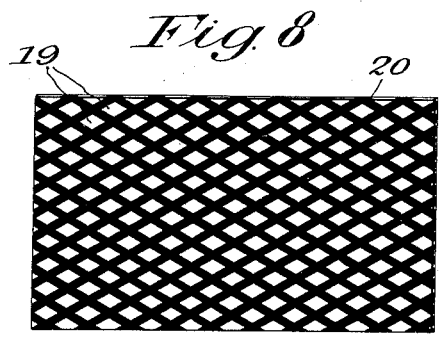
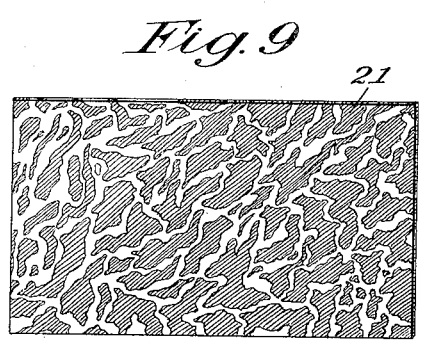
Inventor:
William F. Roberts
By Dike, Calver and Gray
Attorneys Patented Dec. 21, 1937

2,102,747

UNITED STATES PATENT OFFICE 2,102,747

METHOD OF MAKING ORNAMENTED PLASTIC MATERIAL

William F. Roberts, Indian Orchard, Mass., assignor to The Fiberloid Corporation, Indian Orchard, Mass., a corporation of Massachusetts Application April 27, 1935, Serial No. 18,639

3 Claims. (Cl. 18—61)

This invention relates to ornamented structures formed of plastic material, such as a cellulose ester plastic, and especially to the production from such material of structures having plaid or basket weave effects caused by the intersection of lines or stripes forming quadrilateral or similar geometric figures regularly arranged in a predetermined pattern. The production of such structures so ornamented has heretofore been very difficult and expensive, and the present invention makes possible the commercial quantity production of a superior material of this character at a greatly reduced expense.

In accordance with the invention, a sheet is formed containing at least portions of two ornamented plastic sheets which are superimposed and united so that ornamented portions of one sheet may be viewed through portions of the other. If such a sheet contains transparent portions, it may be combined, if desired, with one or more other ornamented sheets to produce a different ornamental effect.

More specifically, the invention involves uniting a plurality of plastic masses, some of which are transparent, to form a block which is subsequently sheeted to obtain ornamented sheets. The sheets thus formed may then be superimposed upon one another in parallel relation and united to form a block in such a manner that ornamented portions of one sheet may be viewed through transparent portions of adjacent sheets. This block is then sheeted along planes parallel to the faces of the component sheets to obtain sheets of different gage containing portions of adjacent component sheets. If the sheets thus formed contain transparent portions, any one of them may be combined with another ornamented sheet to obtain a combined sheet having a different ornamented appearance.

The invention will be more clearly understood from the following description in conjunction with the accompanying drawings: in which, Fig. 1 is a perspective view of a block of plastic material produced as the result of one step in the method of the invention;

Fig. 8 is a plan view of a plastic sheet formed by another step of the method;

Fig. 9 is a plan view of a plastic sheet ornamented different than the sheet shown in either Figs. 5 or 8; and Fig. 10 is a perspective view of an ornamented structure produced in accordance with the invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
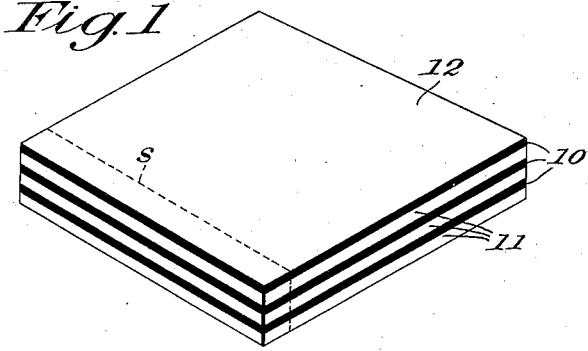
Figure 2:
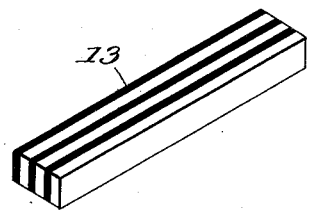
Fig. 2 is a perspective view of a strip of material taken from the block shown in Fig. 1.
Figure 3:
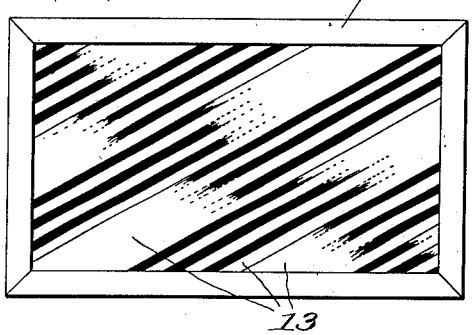
Fig. 3 is a view of a chase or press in which the strips shown in Fig. 2 are combined.
Figure 4:
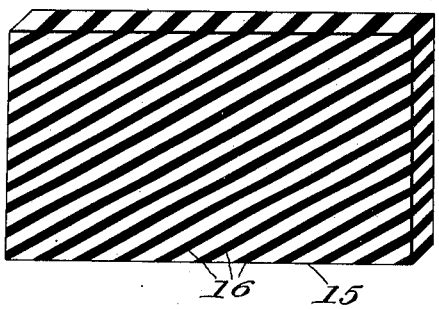
Fig. 4 is a perspective view of a block of plastic material produced by combining the strips illustrated in Fig. 2 in the manner illustrated in Fig. 3.

In accordance with one method of practicing the invention, a plurality of sheets 10 are superimposed alternately with a plurality of sheets 11 and combined to form a plastic block 12. The sheets 10 are colored different than the sheets 11 and may themselves be of different colors and either transparent or opaque. If the sheets 10 are opaque the sheets 11 should be transparent. Strips 13 are formed by slicing the block 12 lengthwise perpendicular to the plane of the sheets 10 and 11 as indicated by the dotted line s. A plurality of strips 13 are now laid up in a chase 14 at an angle, as illustrated in Fig. 3, and are united as by heat and pressure to form a plastic block 15, as illustrated in Fig. 4, having parallel angularly disposed stripes 16.

Figure 5:
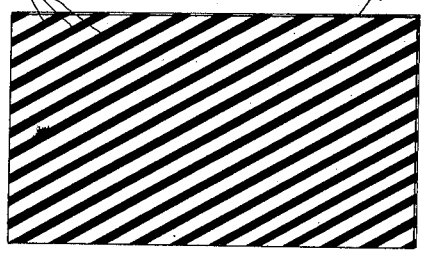
Fig. 5 is a plan view of a sheet of material formed as the result of another step of the method.
Figure 6:
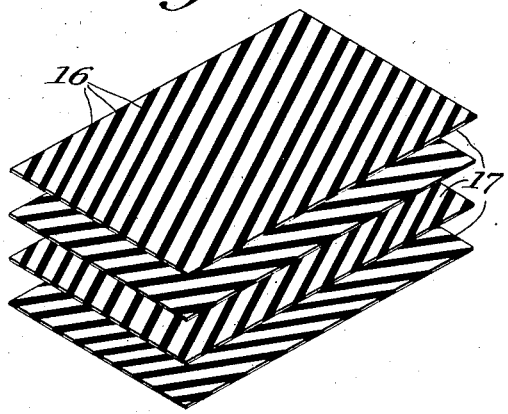
Fig. 6 is a perspective view of a plurality of plastic sheets illustrating another step of the method.
Figure 7:
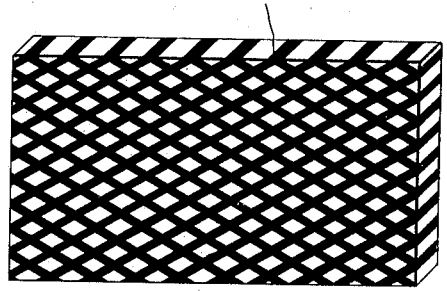
Fig. 7 is a perspective view of a block of plastic material formed as a result of the step of the method illustrated in Fig. 6.

The block 15 is then sheeted to form a plurality of sheets 17, as illustrated in Fig. 5. The sheets 17 are placed one upon another in parallel relation with the stripes 16 of adjacent sheets angularly disposed and with the stripes of alternate sheets alined, as illustrated in Fig. 6. The superimposed sheets 17 are then united as by heat and pressure to form a plastic block 18 in which the parallelism of the original sheets is preserved (Fig. 7). The block 18 is sheeted to form sheets 20 of a gage thicker than the sheets 17 and having a plurality of disconnected similarly shaped portions 19, as illustrated in Fig. 8. As illustrated, the portions 19 are diamond shaped but it will be understood that they could be any other shape, such, for example, as square, by superimposing the sheets 17 so that the stripes 16 of adjacent sheets cross at right angles.

The sheets 20, if desired, each may be superimposed upon and combined with another differently ornamented sheet, such as a sheet 21, illustrated in Fig. 10, thus producing a sheet 22 having an ornamented appearance different than either the sheets 20 or the sheet 21. The sheet 21 may be ornamented in any desired manner. As illustrated, the sheet 21 is a plastic sheet, such as a cellulose ester plastic, formed as an imitation of pearl and which may be produced in accordance with any one of various methods which are well known to those skilled in the art. If desired, the sheet 21 may be a plain colored sheet, the color of which is different than the color of any of the sheets 10 and 11.

I claim:

1. The method of producing ornamented sheets which comprises forming a block by combining a plurality of superimposed plastic sheets, the adjacent sheets being of different color, one of each pair of adjacent sheets being transparent, sheeting said block in a direction transverse to the original sheets to form striped sheets, forming a second block by superimposing and combining said striped sheets in such relative positions that the stripes of adjacent sheets cross, sheeting said second block to produce sheets in which areas of one color appear to be surrounded by areas of another color, and combining one of said last mentioned sheets with another sheet having ornamentation visible through the transparent areas of said superimposed striped sheets.

2. The method of producing from plastic material structures ornamented with plaid effects which comprises forming a plurality of plastic sheets having stripes and intermediate transparent portions, superimposing said sheets in parallel relation and in such relative positions that the stripes of adjacent sheets cross, uniting said sheets into a block in which the original parallelism of the sheets is preserved, and sheeting said block along planes parallel to the original sheets but so spaced as to form sheets of thicker gage than said original sheets.

3. The method of producing from plastic material structures ornamented with plaid effects which comprises superimposing a plurality of plastic sheets having stripes and intermediate transparent portions in such relative positions that the stripes of adjacent sheets cross, uniting said sheets into a block, and sheeting said block along planes parallel to the original sheets but so located that adjacent planes include between them at least portions of two of said original sheets.

WILLIAM F. ROBERTS.